UNITED STATES PATENT OFFICE.

MICHAEL B. BAILEY, OF CHICAGO, ILLINOIS.

IMPROVEMENT IN PAVING COMPOSITIONS.

Specification forming part of Letters Patent No. 221,017, dated October 28, 1879; application filed March 22, 1879.

*To all whom it may concern:*

Be it known that I, MICHAEL B. BAILEY, of the city of Chicago, in the county of Cook and State of Illinois, have invented a new and Improved Paving Composition; and I hereby declare the following to be a full, clear, and exact description of the same.

My invention relates to a composition for paving streets, sidewalks, cellar-floors, and for all analogous purposes.

Of the multitude of composition pavements heretofore contrived, even the very best are found to be defective or impracticable in one or more particulars. Some crack with the shrinkage produced by intense cold; others soften to such a degree under the influence of extreme heat as to be deeply indented by the wheels of vehicles; others crumble under heavy burdens, and ultimately wear thin and uneven; and if all the above defects have in any one instance been overcome it has been at so heavy a cost, pecuniarily, as to preclude the adoption of the composition for general public purposes.

It has been my aim to produce a pavement which shall possess none of the above defects, but which shall, on the contrary, possess every quality that can be desired—firmness, durability, elasticity, and freedom from injury by variations of temperature, and other climatic influences—and which shall at the same time be composed of ingredients so cheap in themselves and so easily compounded as to render its cost no greater than that of the composition pavements in general use.

My invention consists in a composition for paving purposes compounded of the substance "candle-tar" or "sperm-gum," asphaltum, sawdust, sand or gravel, and gum-shellac, as hereinafter more fully set forth.

Sperm-gum or candle-tar is the ordinary trade name for the residuum resulting from refining the material used in the manufacture of sperm candles. It has much of the outward appearance of common pitch, but is more elastic, never acquiring the hardness and brittleness of that substance in a dry state, and it is non-inflammable. It has heretofore been used as an ingredient of paving compositions, as also has sawdust.

In the manufacture of my composition for ordinary purposes I boil the fusible ingredients above named together in a caldron (mixing them well by stirring) in about the proportions following, viz: sperm-gum, one pound; asphaltum, one pound; gum-shellac, one-fourth pound. To this mixture I add one quart (more or less) of fine gravel or sand, previously heated, and about an equal quantity of common sawdust, and allow the mass to cool, stirring it thoroughly meanwhile until the consistency has become sufficiently stiff to prevent settling of the heavier and rising of the lighter ingredients.

The composition may be applied to the purpose of paving either in a continuous layer or in blocks of suitable dimensions. The former is the more general mode of application, the composition being laid to a depth of from two to five inches, depending upon requirement, over a suitable bed—broken stone, cinders, or boards, for example—and rolled with a heavy roller, in the usual way. To make it into blocks it may either be pressed in molds or rolled into slabs on a stone bed, and subsequently sawed into sizes to suit.

This invention presents every attribute of a perfect paving composition, each ingredient serving to supply certain needs and deficiencies in one or more of the others. Thus the candle-tar modifies the brittleness of the asphaltum, being intimately mixed with it, and prevents it from crumbling and chipping, and the gum-shellac gives rigidity and stability to both, serving to "set" the mass. The gravel or sand performs its ordinary function, while the sawdust supplies the place in a large measure of the more expensive ingredients, and, being uninfluenced by variations of temperature, tends to maintain the composition at a uniform degree of solidity. It serves, moreover, to render the pavement cool in summer and agreeable to the tread.

The above proportions as to ingredients are not given with any view to their being strictly adhered to, but only by way of suggesting a mean, as it were, leaving latitude for discretion and judgment within reasonable limits. Thus, if employed for a street whereon it will be subjected to the burden of very heavy travel, or in places where the sun heat is very great at times, the relative proportions of gravel and sawdust should be increased. So, on the other hand, if used for damp cellars and like places it may be found advisable to increase the relative proportions of the impervious ingredients, leaving the cool temperature of such places to make up for the lack of hardening substances.

What I claim as new, and desire to secure by Letters Patent, is—

A paving composition compounded of the following ingredients, viz: the substance sperm-gum or candle-tar, asphaltum, sawdust, sand or gravel, and gum-shellac, substantially as described.

MICHAEL B. BAILEY.

In presence of—
    EDWARD D. WINSLOW,
    P. C. DYRENFORTH.